J. M. DOERNER.
PLOW.
APPLICATION FILED OCT. 11, 1919.
1,395,179.
Patented Oct. 25, 1921.
2 SHEETS—SHEET 1.
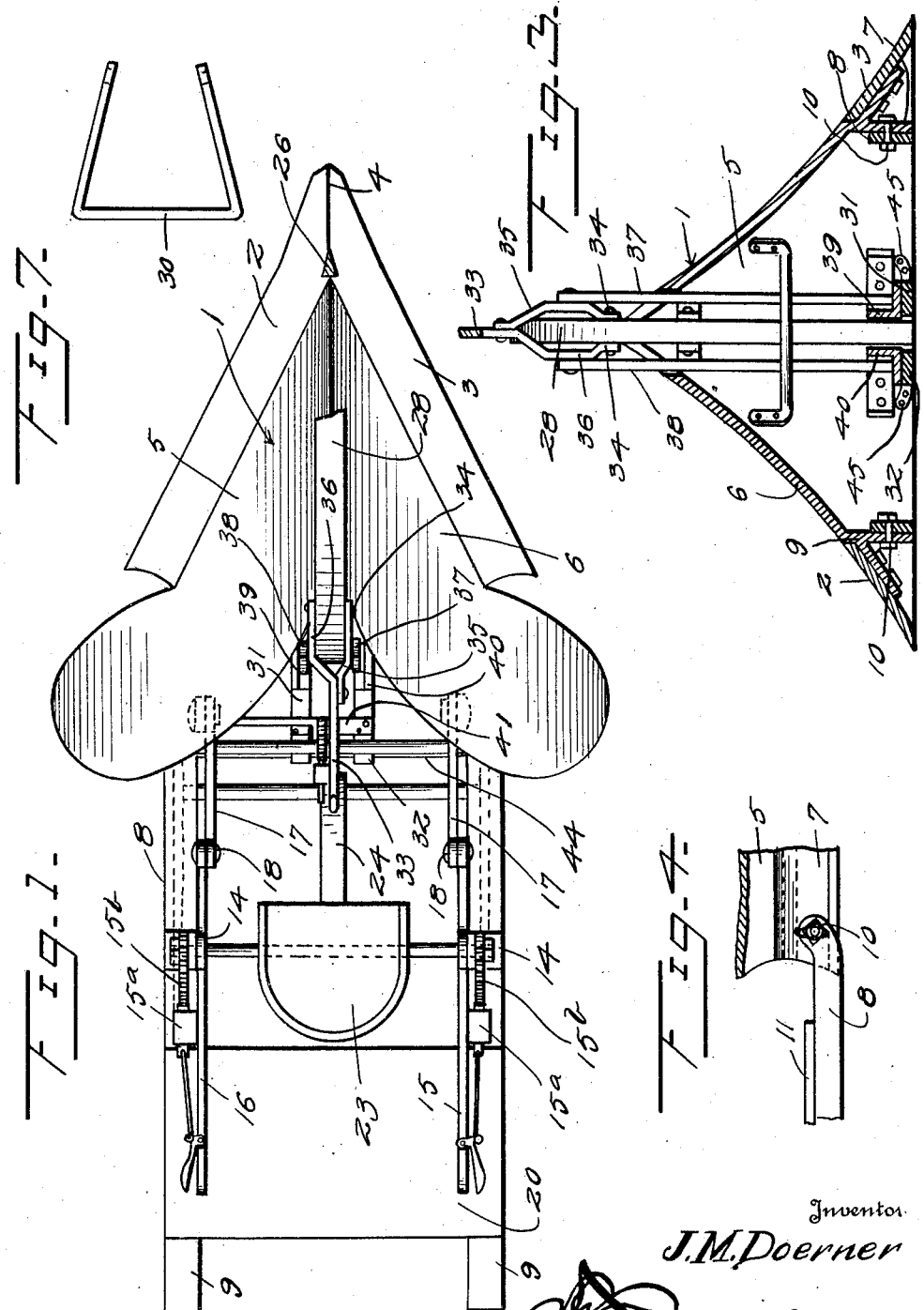

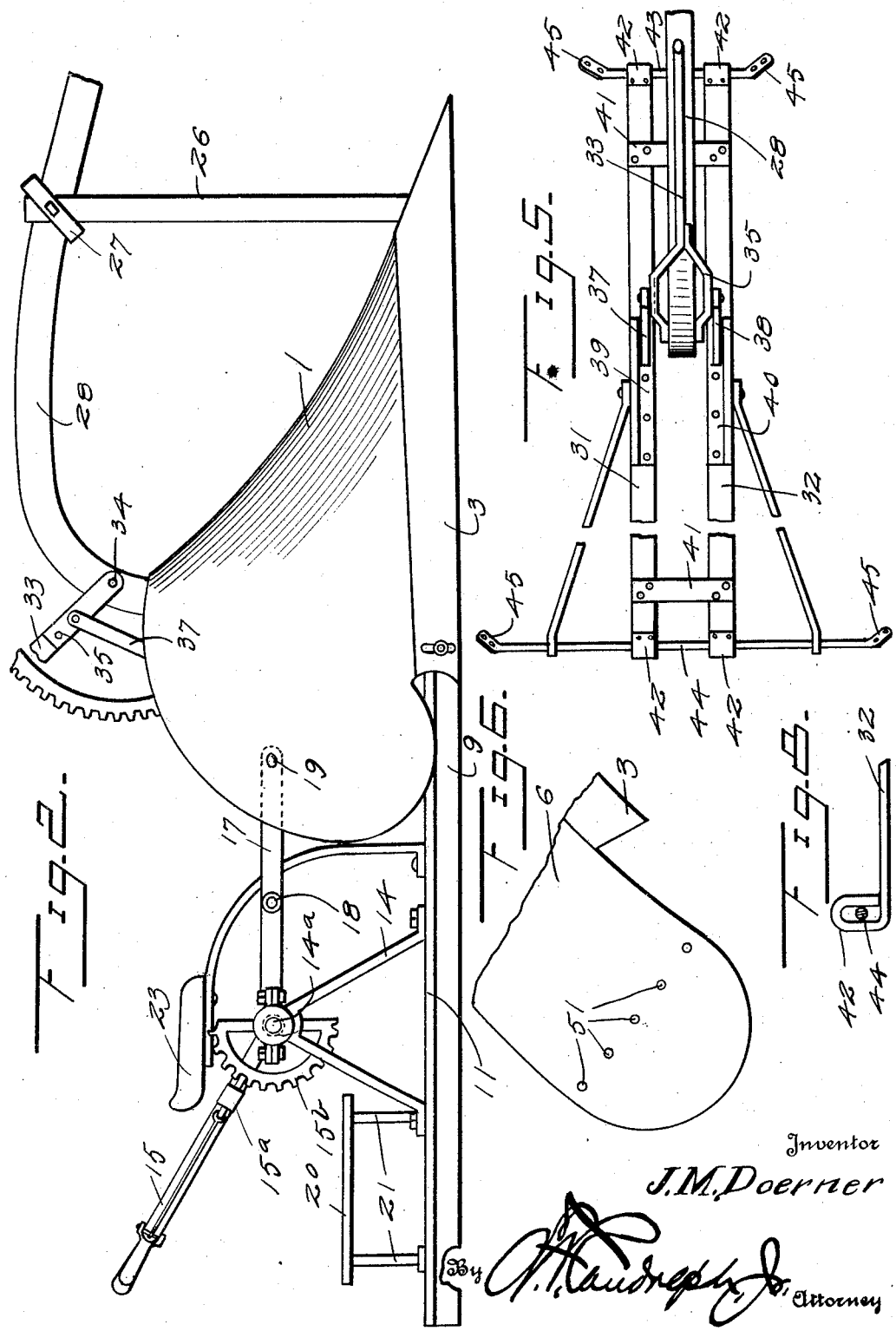

UNITED STATES PATENT OFFICE.

JOHN M. DOERNER, OF ST. CLOUD, MINNESOTA.

PLOW.

1,395,179.  Specification of Letters Patent.  Patented Oct. 25, 1921.

Application filed October 11, 1919. Serial No. 330,008.

*To all whom it may concern:*

Be it known that I, JOHN M. DOERNER, a citizen of the United States, residing at St. Cloud, in the county of Stearns and State of Minnesota, have invented certain new and useful Improvements in Plows; and I do hereby declare the following to be a full, clear, and exact description of the invention, such as will enable others skilled in the art to which it appertains to make and use the same.

This invention relates to plows, and more particularly to a snow plow which is provided with double shares and mold boards, for throwing a furrow upon each side of the plow.

A further object of this invention is to provide runners which are attached to and extend rearwardly from the land side of the plow and to provide means which are carried by said runners for tilting the plow for regulating the depth of insertion of the points of the plow blades into the snow.

A further object of this invention is to provide an auxiliary runner structure which is carried by the plow structure intermediate the mold boards of the same, and which runners have a lever connected thereto and to the beam of the plow for raising or lowering the runners and moving them into or out of engagement with the ground for raising the plow out of engagement with the ground when it is desired to transport the plow from one place to another in an inoperative position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved plow structure having the beam broken away, Fig. 2 is a side elevation of the improved plow structure, Fig. 3 is a vertical section through the plow structure, Fig. 4 is a fragmentary section illustrating the manner of pivotally connecting the runners or land side extensions to the land sides of the plow, Fig. 5 is a plan view of the plow adjusting mechanism, Fig. 6 is a detail view illustrating plates attached to the mold board of the plow for increasing its turning scope, Fig. 7 is a detail view of a handle which may be attached to the plow if desired, Fig. 8 is a detail view, illustrating the connection of one of the runners to one of the pivot rods.

Referring more particularly to the drawings, 1 designates the plow structure as an entirety, which comprises two shares 2 and 3, which have their forward ends converging and terminating in a point as indicated at 4 in Fig. 1 of the drawings. Two mold boards 5 and 6 are provided which curve oppositely to the longitudinal axis of the device for throwing the snow upon each side of the plow structure.

The mold boards 5 and 6 have land side extensions 7 formed thereupon, to the rear ends of which are pivotally connected runners 8 and 9, by means of bolts or analogous devices 10.

The runners 8 and 9 have standards 14 carried thereby, which support a shaft 14$^a$ at their upper ends. The shaft 14$^a$ extends transversely across the plow structure and has hand levers 15 and 16 pivotally connected thereto which carry dog mechanisms 15$^a$. The dog mechanisms 15$^a$ coact with quadrants 15$^b$ carried by the standards for holding the levers in adjusted position. Links 17 are pivotally connected to the hand levers 15 and 16 as shown at 18. The links 17 are connected, as shown at 19 to the mold boards 5 and 6 so that when the levers 15 and 16 are oscillated, the rear end of the mold boards or plow structure 1 will be raised or lowered for regulating the depth of insertion of the point 4 of the plow into the snow.

A seat 23 of the ordinary construction is supported by the usual type of spring standard 24, above the runners 8 and 9. A platform 20 is carried by suitable standards 21, which standards are secured to the runners 8 and 9. The platform 20 is positioned rearwardly of the shaft 14$^a$ as clearly shown in Fig. 2 of the drawings.

A colter blade 26 is connected in any suitable manner as shown at 27 to the beam 28 of the plow and it extends downwardly to the meeting edges of the plow shares.

In using the plow structure, a tongue and double-trees should be connected to the forward end of the beam 28, for preventing the plow from creeping up on the draft animals used for drawing the plow.

A pair of runners 31 and 32 are provided which are forced, by the pivotal movement of a lever 33, into operative or inoperative position. When the runners 31 and 32 are forced downwardly, they will raise the entire plow structure slightly so as to cause the weight of the plow to be borne by the runners 31 and 32, and lift the plow share edges off the ground, so as to allow the plow to be transported in an inoperative position, when desired. The lever 33 is pivotally connected as shown at 34 to the beam 28, and it has a bar 35 connected thereto and spaced slightly therefrom as clearly shown in Fig. 5 of the drawings. The lower end of the lever 33 is also bowed outwardly as shown at 36 so that its bowed portion will lie parallel to the straight portion of the bar 35 and in spaced relation thereto. A pair of arms 37 and 38 are connected to the bar 35 and bowed portion 36 respectively and to a pair of angled irons 39 and 40 which are carried by the runners 31 and 32. The runners 31 and 32 are connected and braced by suitable bracing bars 41. The forward and rear ends of the runners 31 and 32 are rolled upon themselves as shown at 42 and about rods 43 and 44 respectively. The rods 43 and 44 have their ends flattened as shown at 45 the rod 44 is secured to the runners 9 and the rod 43 is attached to the inner surface of the mold boards 5 and 6 of the plow structure. The runners 31 and 32 have vertical movement on said rods 43 and 44.

When the lever 33 is moved rearwardly, it will force the runners 31 and 32 downwardly below the lower edge of the plow shares 2 and 3 for raising the plow shares off the ground to allow the plow structure to be transported from one place to another without the lower edges of the shares engaging the ground, or also for regulating the distance between the plow shares and the ground, so that during the snow shoveling or plowing operation, the plow shares will not rub upon the ground or surface over which the plow is traveling.

In Fig. 6 of the drawings, a plate 50 is shown attached to the rear edge of the mold board 6, by means of suitable bolts or analogous fastening devices 51. This plate is attached to the rear end of the mold board for increasing the turning scope of the mold board and causing the mold board to throw the snow at greater distances.

In Fig. 7 of the drawings, a handle structure generically indicated by the numeral 30 is provided, which handle structure is composed of a metallic rod bent to assume substantially a U-shape. The legs of the handle 30 are adapted for connection to the mold boards 5 and 6 in lieu of the links 17, when it is desired to regulate the operation of the plow by hand directly in lieu of through the medium of the hand levers 15 and 16 as previously described.

In reducing the invention to practice, certain minor features of construction, combination and arrangement of parts may necessitate alterations to which the patentee is entitled provided such alterations are comprehended within the scope of what is claimed.

What is claimed is:—

A snow plow comprising a sled structure, a plow pivoted to said sled structure and having a pair of wing portions converging toward their forward ends, means for varying the pitch of said plow, a pivot rod secured to the sled structure, a pivot rod secured to the wings of the plow, runners having their ends looped and surrounding said rods and located forwardly of the sled structure and between the wings of the plow, a lever pivoted to the plow, links pivoted to the lever and to the runners for forcing the latter into engagement with the ground to elevate the plow.

In testimony whereof I affix my signature in presence of two witnesses.

JOHN M. DOERNER.

Witnesses:
ALVINA RUKTENWALD,
J. I. DONOHUE.